July 28, 1964 P. J. BROWNSCOMBE 3,142,240
PAPER CONVEYOR
Filed Aug. 30, 1961 5 Sheets-Sheet 1

INVENTOR:
PHILIP J. BROWNSCOMBE
BY
ATT'YS

July 28, 1964 P. J. BROWNSCOMBE 3,142,240
PAPER CONVEYOR
Filed Aug. 30, 1961 5 Sheets-Sheet 2

INVENTOR:
PHILIP J. BROWNSCOMBE
BY
ATT'YS

INVENTOR:
PHILIP J. BROWNSCOMBE

INVENTOR:
PHILIP J. BROWNSCOMBE

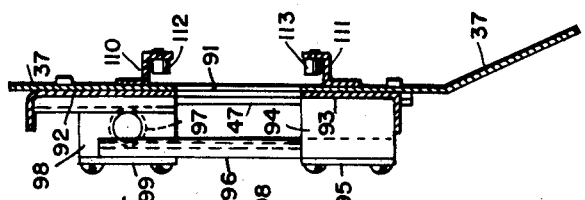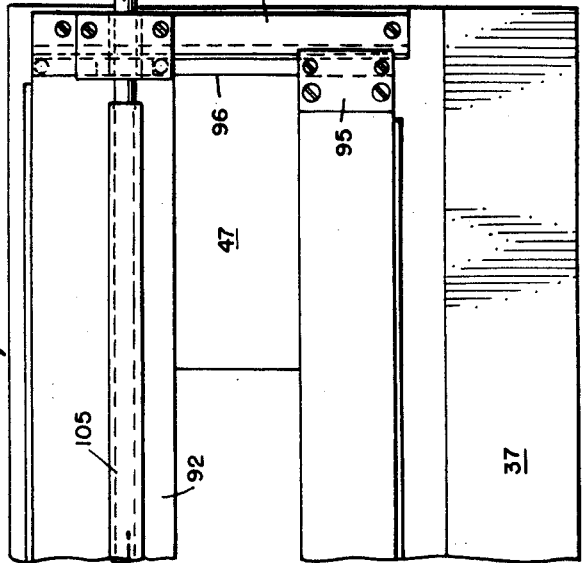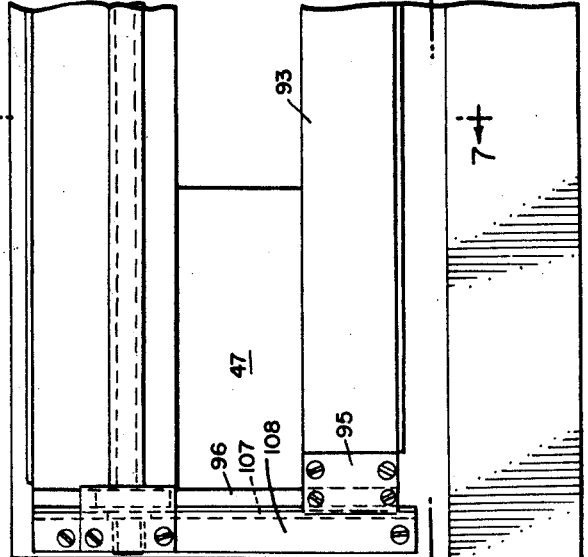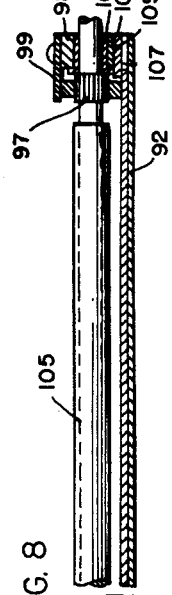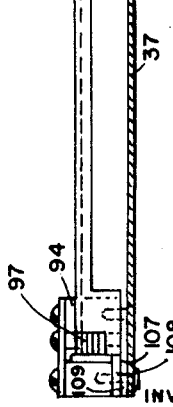

United States Patent Office 3,142,240
Patented July 28, 1964

3,142,240
PAPER CONVEYOR
Philip J. Brownscombe, Millington, N.J., assignor to Eugene Dietzgen Co., Chicago, Ill., a corporation of Delaware
Filed Aug. 30, 1961, Ser. No. 134,878
9 Claims. (Cl. 95—76)

This invention, in general, relates to photographic machines and, more particularly, relates to machines for the photographic reproduction of markings, printing, drawings, on paper sheets and the like onto photographic paper. This invention especially relates to paper-conveying mechanism for conveying the paper, whose markings, printing, drawings, etc., are to be reproduced on the light-sensitive paper, through the machine in contact with the surface of a rotatably driven roller.

Briefly, the paper-conveying mechanism of the invention constitutes a rotatably driven roller which carries the paper through a lighted zone. The paper in this lighted zone must be held in tight contact with the surface of the conveying roller to avoid blurs or distortions in the reproduction thereof on a light-sensitive paper.

The paper is held tightly against the surface of the roller by applying a light air pressure against the surface of the paper opposite to that in contact with the roller. This is achieved by utilizing a housing having means to admit blown air thereto. The side of the housing facing the paper-conveying roller is open and the other sides of the housing are substantially sealed against loss of air from the housing except via said open side. The paper-conveying roller has a shallow grooved surface so that the roller side of the conveyed paper is at about atmospheric pressure. The circumferential grooves or depressions on the roller provide communication between the roller side of the paper and the atmosphere. By applying a light air pressure to the paper on a grooved roller, it is held in firm contact with the ribs between the shallow grooves on the roller and can be conveyed through the exposure area pressed tightly against the surface of the roller.

An embodiment of the invention is illustrated in the drawings wherein:

FIG. 6 is a top view of the shutter mechanism of the exposure chamber taken on a section equivalent to 6—6 of FIG. 1;

FIG. 7 is a cross-sectional view taken on section 7—7 of FIG 6; and

FIG. 8 is a cross-sectional view taken on section 8—8 of FIG. 6.

Figure 1:
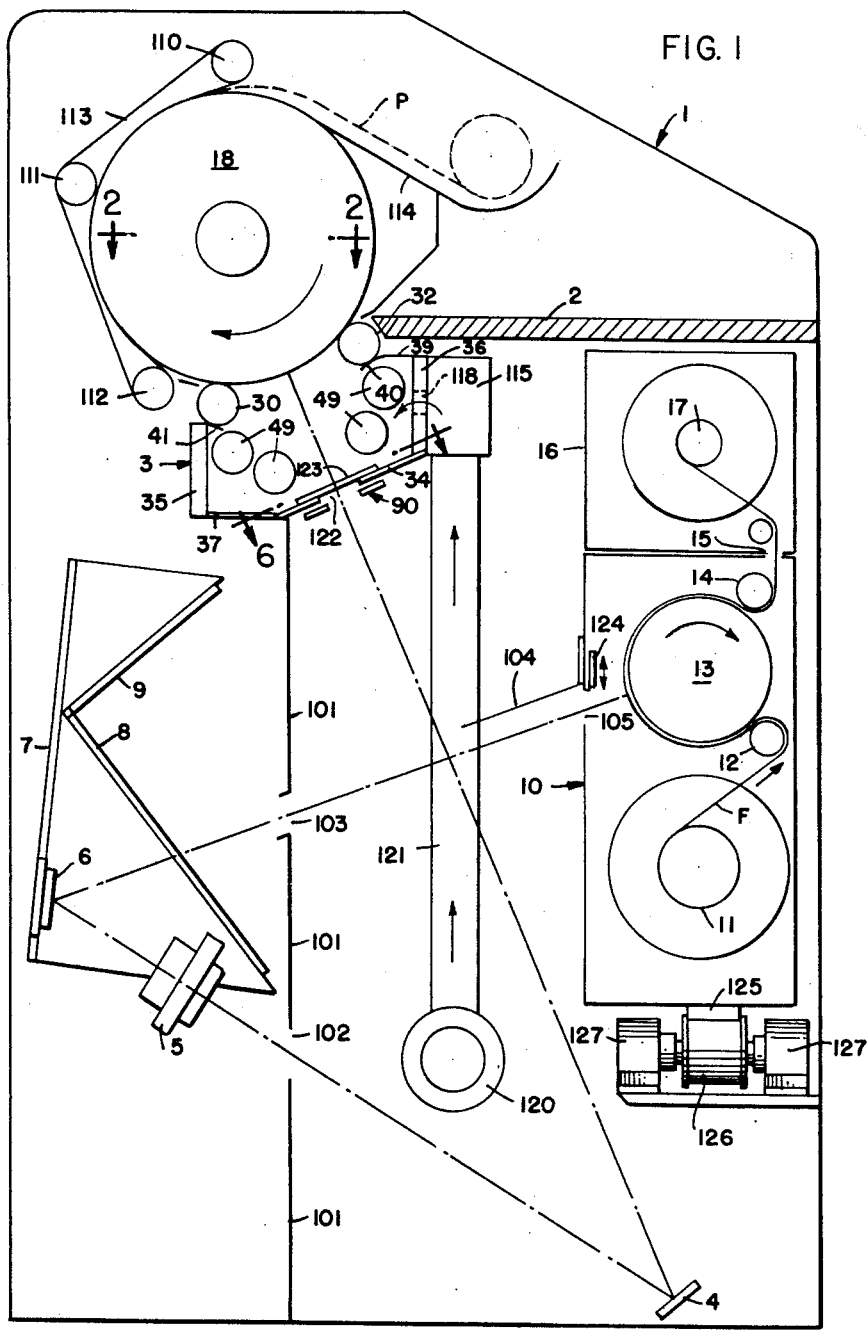
FIG. 1 is a diagrammatic illustration in side elevation of a photographic reproduction machine embodying the paper-conveying mechanism of the invention.

Referring to FIG. 1, the photographic machine 1 has a rigidly mounted paper feed board 2 on which is laid the paper to be fed through the machine and photographed. Briefly, the components of the machine constitute an exposure chamber 3 which is lighted by means later described. The light from the chamber 3 is reflected by the planar mirror 4 through lens 5 onto a planar mirror 6 mounted on a frame 7 to reproduce a reverse reading image. The frame 7 is mounted by means (not shown) which enable the pivoting thereof 90°. The frame 7 also has mounted thereon a pair of planar mirrors 8 and 9 which are substantially at right angles to each other with the junction of the mirror planes lying substantially in the extended plane of the mirror 6. Mirrors 8 and 9 can be pivoted into reflecting position with respect to the lens 5 to give a system which will provide a right-reading of the material photographically reproduced by the machine.

Light from mirror 6 or mirrors 8 and 9 is reflected into the photographic reproduction section 10 which contains a supply roll 11 of light-sensitive paper or film F which is conveyed around roller 12 to the surface of the exposure roller 13. The exposed film is then conveyed around roller 14 and through aligned openings 15 in the exposure section 10 and the magazine section 16 mounted thereon, whereupon it is wound on the magazine spool 17. At any desired time, the magazine section 16 can be removed for development of the exposed film.

The inside of the machine 1 has a divider plate 101 with black or other light-absorbing surfaces to minimize the reflection of stray light from the exposure section 3 onto the film F. It has openings 102 and 103 to allow passage of light reflected from the mirrors 4 and 6, respectively. A similar plate 104 is mounted just above the opening 105 of the film exposure section 10 to similarly minimize the admittance of stray light from the section 3 into the exposure section 10.

Figure 2:
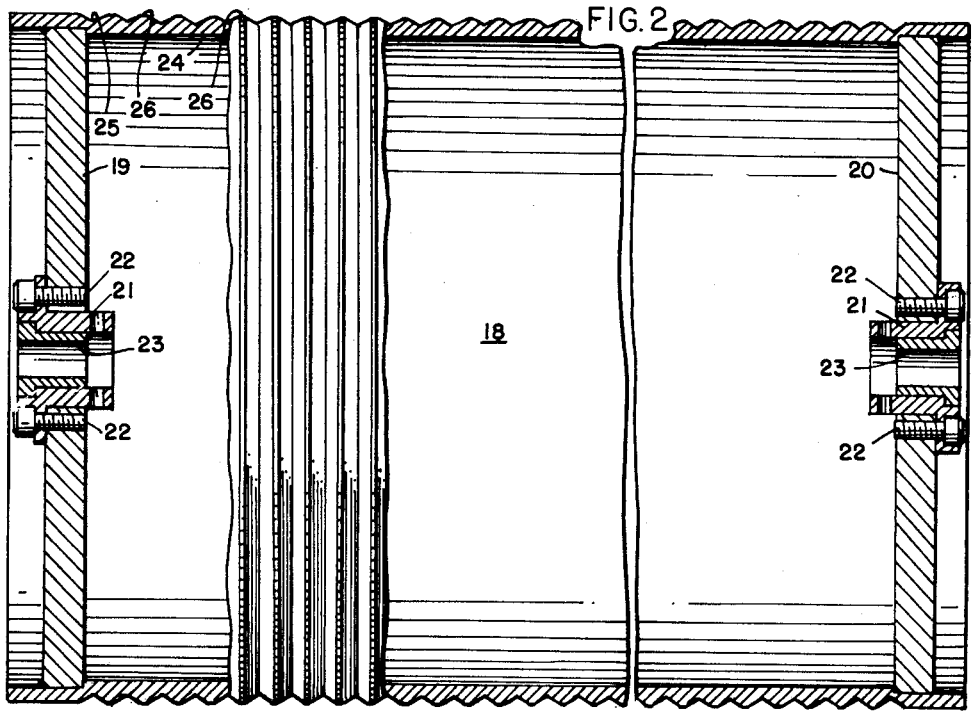
FIG. 2 is a broken side elevation, partly in diametric cross-section, of the paper-conveying roller.
Figure 3:
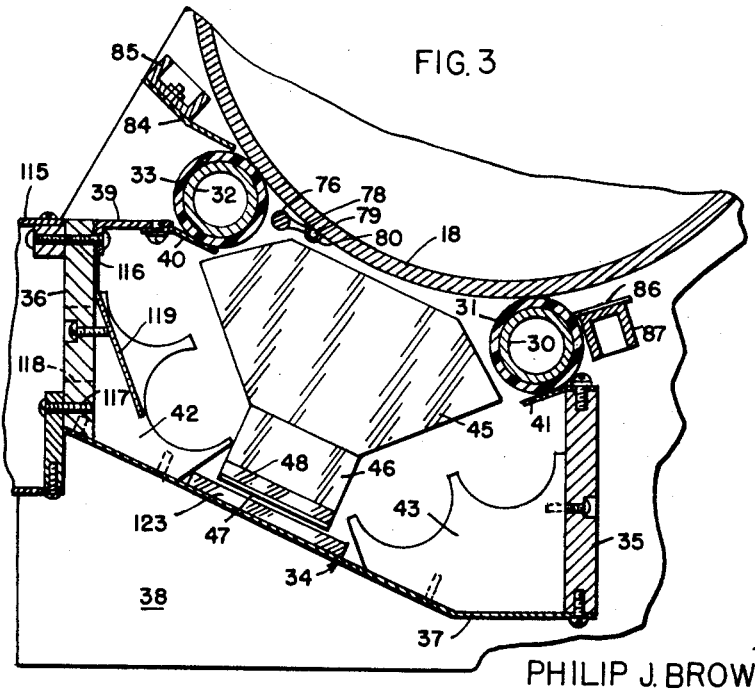
FIG. 3 is a side elevation, taken in cross-section at one end thereof, of the exposure chamber, paper-conveying roller, and associated mechanism.

Referring to FIG. 2, the roller for conveying the paper through exposure section 3 designated generally by the numeral 18, is made up of a pair of end discs 19 and 20, each having a central aperture in which is mounted the bearing 21 for the shaft of the roller. The bearing 21 is mounted on the discs 19 and 20 by means of screws 22 and has a bushing 23 mounted therein.

The cylindrical wall 24 of the roller 18 has an outer surface with alternating shallow grooves 25 and ribs 26. The ribs 26 may be rounded or may have flat lands, preferably with rounded edges. The alternating circumferential, shallow grooves and ribs serve the purpose previously described.

The surface of the roller or drum 18 preferably is a reflective surface such as a soft white. The grooved cylinder of the roller 18 may be made of metal or a plastic. The slope of the side walls of the grooves should be at an angle of 40° or less with respect to the drum axis to avoid shadow effects when the paper is photographed. A 20° to 35° angle is preferred.

Riding on the lower surface of the roller 18 is a pair of freely rotatable rollers 30 and 32 having rubber coverings 31 and 33, respectively. These rollers provide a substantially air-tight seal between the front and rear walls of the exposure chamber 3 and the roller 18. The exposure chamber 3 is made up of a housing designated generally by the numeral 34, which housing has a rear wall 35 and a front wall 36 which extend between and are bolted to the end walls 38 of the frame of the machine. The bottom wall 37 of the housing is attached to and extends between the front and rear walls 35 and 36 and also extends between the side walls 38 of the frame. The aforedescribed walls form a 5-sided enclosure with the open end facing the roller 18.

An L-bracket 39 extending between the walls 38 is attached to the top of the front wall 36. This bracket serves as a mounting for a resilient strip 40 extending between the side walls 38. The strip 40 continually presses against the surface of the roller 32 to seal the space between the roller 32 and the L-bracket 39 and essentially prevents escape of air therebetween. A similar resilient strip 41 is mounted on the top of the rear wall 35 and presses against the surface of the roller 30 for the same purpose.

One or more light tube cradles 42 and 43 are mounted in the housing 34 at spaced intervals between the end walls 38. A 6-sided mirror 45 and a rectangular mirror 46 are mounted on the end walls 38. These mirrors intensify the light in the chamber at each end of the lighting tubes later described, which light tubes normally produce a brighter light in the middle portions than at the end portions. The end walls 38 also have mounted thereon a plate 47 extending inwardly into the housing or chamber 34 in a plane normal to the plane of the walls 38. Plate 47 has mounted thereon a mirror 48 at right angles to the mirrors 45 and 46. The mirror 48 functions in cooperation with the mirrors 45 and 46 in intensifying the light at the ends of the housing 34.

Figure 4:
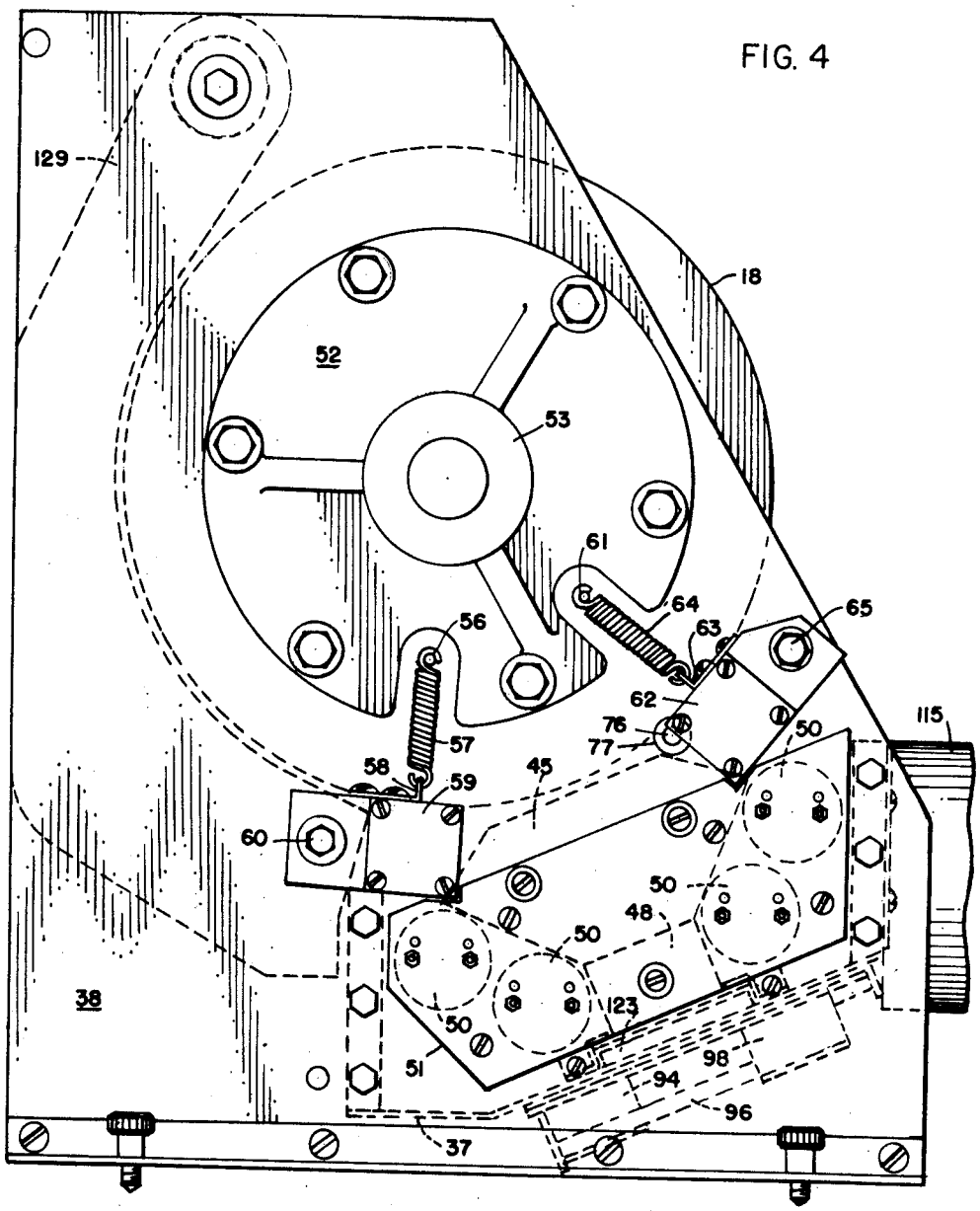
FIGS. 4 and 5 are respective end views of the frame of the machine constituting the paper-conveying and exposure sections of the photographic reproduction machine.

The light tubes in the housing 34 may be of any suitable type, e.g., fluorescent tubes 49. These tubes are mounted in sockets 50 which are, in turn, mounted on the plate 51 shown in FIG. 4.

Each side wall 38 has bolted thereon plates 52 and 54 with axle hubs 53 and 55 for the axle of the roller 18. The roller 18 is driven from an electrical motor by a belt and pulley at a constant speed. Such drives are conventional and have not been shown in detail herein.

The side wall 38 (FIG. 4) has a pin 56 on which is mounted one end of the tension spring 57. The other end of the spring 57 is attached to L-bracket 58 which, in turn, is mounted upon bearing housing 59 in which is journalled one end of the shaft of the roller 30. The bearing housing 59 is pivotally supported on the bolt 60 whereby the spring 57 holds the roller 30 in contact with the surface of the roller 18. A similar pivotal mounting and spring bias is provided for an end of the roller 32 by the pin 61, bearing housing 62, spring 64 and bolt 65.

Figure 5:
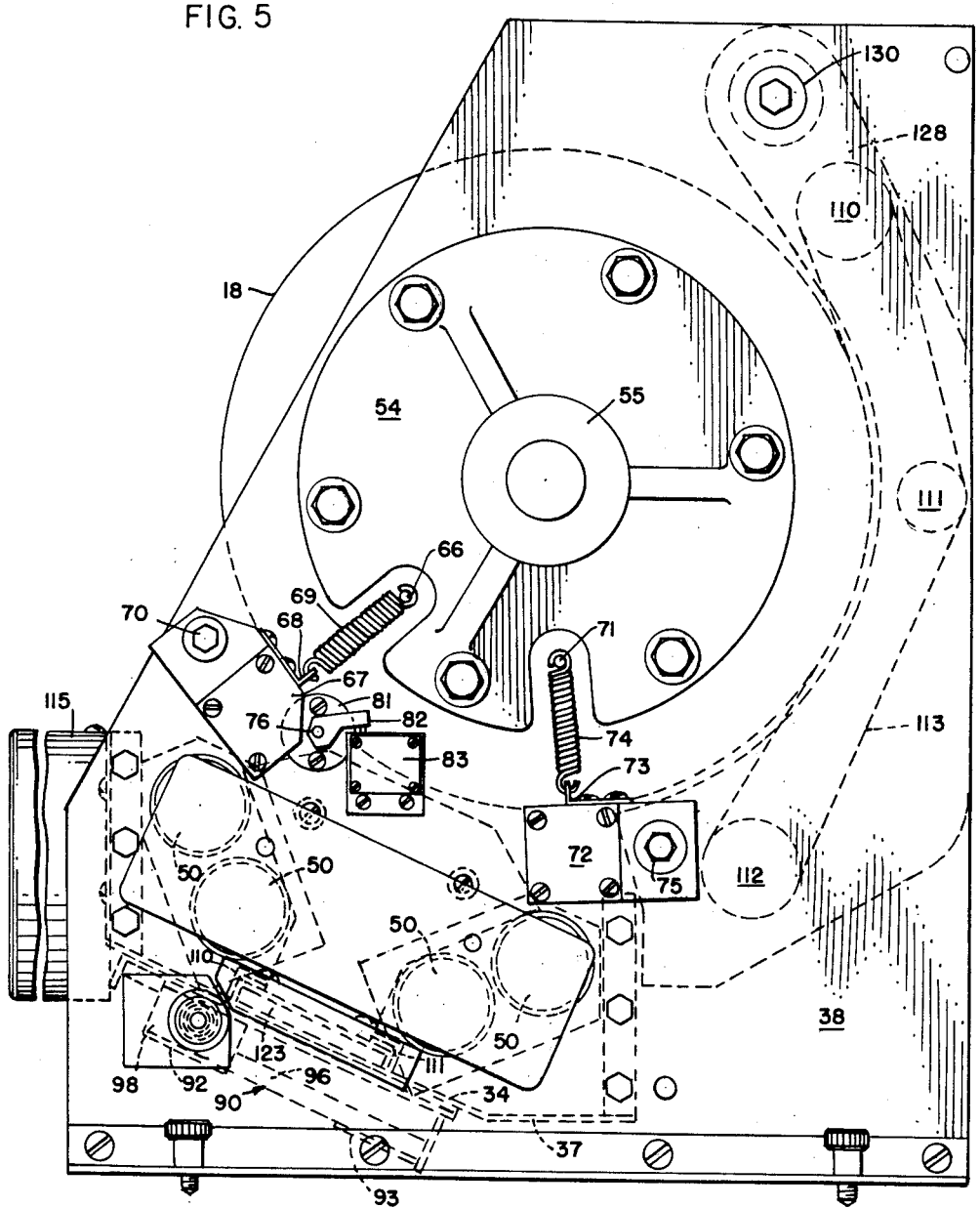

The shafts of the rollers 30 and 32 are similarly journalled in pivotable, spring biased bearing members on the opposite side of the frame (FIG. 5) by means of the pins 66, 71, bearing housings 67, 72, L-brackets 68, 73, springs 69, 74 and bolts 70, 75.

There is a pivotable shaft 76 extending between sides 38. One end of the shaft is mounted in a bearing 77 (FIG. 4) in the side 38. The shaft 76 has two arms 78 extending outwardly therefrom. These arms support a shaft 79 upon which is rotatably mounted one or more rollers 80 which ride in grooves in the drum 18.

The other end of the shaft 76 is mounted in the plate 81 (FIG. 5) and journalled therein for rotation. This end of the shaft 76 has attached thereto an arm 82 which actuates the pin and closes the switch of microswitch 83. When paper passes across the roller 32, it contacts the roller(s) 80 on the arms 78, causing the shaft 76 to rotate. This then closes the microswitch 83. The microswitch is connected in the circuit of the machine to energize the shutter solenoid of the camera 10 to open it and also to activate the drive for the film F, so that it is drawn across the roller 13. The details for the shutter mechanism and the drive for the film F are disclosed in my copending application filed concurrently herewith.

The microswitch 83 may have a delay mechanism associated therewith so that, when it closes after the trailing end of the paper passes over the roller(s) 80, the machine is not shut down until the trailing edge of the paper is in proximity with the roller 30. Alternatively, the circuit for the machine may include a holding circuit which keeps the machine in operation until a second switch adjacent the roller 30 is caused to be activated by the paper and break the holding circuit. Such circuitry is conventional in the art and is not illustrated or described in detail. By this combination, the camera is open and the film is moved only when copy is in the exposure section for reproduction by the camera.

Extending between the side members 38 of the frame is a guide plate 84, the end of which is positioned adjacent the roller 32. This guide plate is mounted on the bracket 85. The function of this guide plate is to direct the paper into the nip of the rollers 18 and 32. A similar guide plate 86, mounted on bracket 87, extends between the side members 38 adjacent the roller 30. An end of the guide plate 86 is adjacent the surface of the roller 30 to lift off the paper if it should become stuck to the rubber surface 31 of the roller 30.

The housing 34 has a rectangular shaped shutter 90 which is mounted about the opening 91 in the plate 37. This shutter has a pair of movable shutter plates 92, 93 which reciprocate toward and away from each other so that the size of the opening therebetween can be set. The mechanism for mounting these plates and for actuating them includes a bar 94 attached to the shutter plate 93. The bar 94 has attached to its upper surface a plate 95, to which is also attached a rack 96. The teeth of the rack 96 mesh with a spur gear 97. The rack 96 slides under the plate 99 which is attached to the bar 98. The bar 98 has an aperture in which is mounted a bushing 106 which journals a shaft 105 having the gears 97 on each end thereof. The side edges of the shutter plates 92 and 93 slide in grooves 107. The grooves 107 are formed by the upper surface of the plate 37, the lower surface of the elongated side plate 108 and the spacer plate 109 positioned therebetween. The shaft 105 is connected by gears, pulleys or the like to an adjusting knob (not shown) on the cabinet of the machine.

A series of rollers 110, 111 and 112 with one or more belts 113 mounted thereover are utilized in the conventional manner to guide the paper over the rear surface of the roller 18 after which it is discharged from the machine across the guide plate 114. These belts 113 are in contact with and driven by the roller 18. The rollers 110–112 are journalled in opposing arms 128, 129. These arms are pivotally mounted on a rod 130 extending between end walls 38 so that the belt assembly can be swung upwardly away from the drum 18 to provide access to the rear side of the drum.

Air is blown into the exposure chamber or housing 34 through a manifold 115 attached to the wall 36 by means of screws 116 and 117. The wall 36 has a plurality of elongated openings 118 spaced along the length thereof to admit the air into the housing 34. The air is deflected downwardly by a deflector plate 119 mounted on the inside of wall 36 by the screw 116 so that the pressure is relatively constant across the opening of the housing 34. The blower 120 and air duct 121 connecting the blower and the manifold 115 have been illustrated diagrammatically in FIG. 1. The opening 122 in the chamber 3 opposite the drum 18 is covered by a glass plate 123.

The rollers 18 and 13 are rotated at equal angular velocities, preferably by interconnecting belt or steel band pulley drives driven by a common motor. Their diameters are in a ratio substantially equal to the ratio of reduction or enlargement provided by the mirror and lens system of the machine. As an example, where the machine reproduces at a size one-half of that of the original, the roller 13 will have a diameter which is approximately one-half that of the roller 18. This ratio, plus the equal angular velocities of the two rollers, gives a distortion-free print.

When the machine is turned on, the drum 18 rotates and the light tubes 49 are lit. The shutter 90 is adjusted manually to the proper slit width, and the frame 7 is pivoted to position the mirror 6 or the mirror 9 in front of the lens 5, depending upon whether a right-reading or a reverse-reading reproduction is desired. The whole camera is shifted sideways upon changing the mirror system to compensate for a lateral displacement of the reflected image upon positioning mirror 6 in front of lens 5 in place of mirror 9, or vice versa. The camera has a bar 125 on its underside which rides in a pair of grooved wheels 126 journalled in bearings 127. A power operated mechanism for this purpose is disclosed in my copending application filed concurrently herewith.

Paper or other sheeting containing the copy to be reproduced is pushed along the feed board 2 until it is picked up between the nip of the rotating drum 18 and the roller 33. As the paper travels into exposure chamber 3, its leading edge pushes the roller(s) 80 downwardly. This closes microswitch 83. Microswitch 83 is in a circuit which energizes the drive for the camera roller 18 and also energizes a solenoid to open shutter 124 of the camera 10. The details of these mechanisms are disclosed in my copending application filed concurrently herewith.

The roller 13 begins to rotate at the same angular velocity as the drum 18. The light-sensitive paper or film F is drawn off the supply roll 11 over rollers 12 and 13. As it travels over roller 13, it is exposed to the image on the copy sheet reflected to it by mirrors 4 and 6 or 8 and 9 through lens 5. Assuming a reduction ratio of 2:1 in size of the copy image to the size of the recorded image, the distance of the folded light path between the copy sheet on the drum 18 and the lens 5 is approximately twice the distance of the folded light paper between the lens 5 and the light-sensitive paper or film on the exposure roller 13. This holds true whether the mirror 6 or the mirror 9 is positioned in front of the lens 5. The ratio of the diameter of drum 18 to the diameter of roller 13 (and correspondingly the arc radius of the copy sheet on drum 18 to the arc radius of the light-senstive paper or film F on roller 13) is 2:1, respectively.

This arrangement gives an accurate recording of the copy on the arcuate copy sheet moving through the exposure section on the arcuate light-senstive paper or film.

The light-sensitive paper or film F after exposure is drawn over rollers 14 and 15 into the magazine section 16 where the exposed paper or film is wound on roller 17. The roller 17 is driven so as to maintain tension in the paper or film F to keep it in tight contact with the roller 13.

The principle of recording in this invention is one of recording a marking on a copy sheet onto a light-sensitive sheet while both are moving at predetermined, correlated velocities in an arcuate path. By following the principles of the invention, a suitably distortion-free image is reproduced in the recording of a moving image onto a moving light-sensitive sheet.

After the trailing edge of the copy sheet passes over roller 80, the microswitch 83 opens. The drive for the camera roller 13 and the camera shutter solenoid, however, must not be deenergized if the trailing end of the sheet contains copy which has not passed completely through the exposure zone at the time microswitch 83 opens, for otherwise this portion will be underexposed. Therefore, the circuit for the camera drive and the camera shutter has a time delay mechanism or another paper-operated switch to keep the drive and shutter solenoid energized for sufficient time to obtain complete exposure of the trailing end of the copy sheet. Then the circuit for the drive and shutter is broken whereupon the camera operation is stopped, and the camera shutter is closed. The copy sheet carries around the drum 18 under the belts 113 and returns to the front of the machine.

The foregoing constitutes but one embodiment of the principles of my invention, and other modifications and variations may be employed without departing from the spirit and scope of the invention set forth in the following claims.

The invention is hereby claimed as follows:

1. A paper-conveying mechanism comprising a rotatably driven paper-conveying drum, a housing on one side of said drum, the side of said housing facing said drum being open, lamps mounted in said housing for illuminating a paper sheet conveyed through said housing on said drum sufficiently to make a photographic reproduction thereof, means for admitting blown air into said housing, and rollers contacting said drum and substantially sealing off the space between said housing and said drum whereby said housing is maintained at a pressure above atmospheric pressure when air is blown into said housing to hold paper conveyed by said drum across said opening of said housing tightly on the surface of said drum.

2. A paper-conveying mechanism comprising a paper-conveying drum, a chamber on one side of said drum with two opposite walls parallel to the axis of the drum spaced from said drum, the side of said chamber facing said drum being open, means for admitting blown air into said chamber, a pair of spaced, parallel rollers substantially sealing the space between said opposite sides and said drum, said pair of rollers riding on said paper-conveying drum whereby said chamber is maintained at a pressure above atmospheric pressure when air is blown into said housing to hold paper conveyed by said drum across said opening of said chamber tightly against the surface of said drum.

3. A paper-conveying mechanism comprising a paper-conveying drum with a plurality of substantially equally shallow grooves extending around the cylindrical surface of said drum, a chamber on one side of said drum with two opposite walls parallel with the axis of said drum spaced from said drum, the side of said chamber facing said drum being open, a pair of spaced, parallel rollers substantially sealing the space between said opposite sides and said drum, said pair of rollers riding the raised portions between said grooves on said paper-conveying drum whereby air blown into said housing maintains said housing at a pressure above atmospheric pressure and the drum side of paper on said drum is at substantially atmospheric pressure.

4. A photographic machine comprising a frame having a pair of oppositely disposed side walls, a bearing on each side wall, a rotatably driven drum having its axle journalled in said bearings, a chamber on one side of said roller with two opposite walls extending longitudinally along but spaced from said drum, the side of said chamber facing said drum being open, a pair of spaced, parallel rollers substantially sealing the space between said opposite sides and said roller, said pair of rollers riding on said paper-conveying roller whereby air blown into said housing holds paper conveyed by said roller across said opening of said housing tightly against the surface of said roller, said pair of rollers being journalled in bearing members pivotally mounted on said frame, and bias means mounted on said side members of said frame pivotally urging said rollers into contact with said paper-conveying roller.

5. A paper-conveying mechanism comprising a paper-conveying drum, a chamber on one side of said drum with two opposite walls which are parallel with the axis of said drum being spaced from said drum, the side of said chamber facing said drum being open, a pair of spaced, parallel rollers slightly spaced from said opposite sides, said pair of rollers riding on said paper-conveying drum, and a flexible strip mounted on each of the side walls of said chamber and resiliently bearing against the surface of said roller adjacent said side wall to seal the space therebetween.

6. The combination for moving and exposing for reproduction a copy sheet through an exposure section of a photographic reproduction machine comprising an exposure chamber having an open side, a cylindrical drum rotatably mounted at said open side, said drum having a reflective cylindrical surface with circumferential, shallow grooves in said surface, lighting means in said chamber, and means for creating a pressure higher than atmospheric in said chamber.

7. In a photographic reproduction machine having a section for exposing a copy sheet and a section for recording the image of said copy sheet on a light-sensitive sheet, the improvement which comprises a rotatable drum having a cylindrical, soft white reflective surface with circumferential shallow grooves in said cylindrical surface, the walls of said grooves being disposed with respect to the axis of said drum at an angle not exceeding about 40°.

8. The drum of claim 7 wherein said grooves are V-shaped grooves.

9. A paper-conveying mechanism comprising a paper-conveying drum, a chamber on one side of said drum with two opposite walls which are parallel with the axis of said drum being spaced from said drum, the side of said chamber facing said drum being open, a pair of spaced, parallel rollers slightly spaced from said opposite sides, said pair of rollers riding on said paper-conveying drum, and a flexible strip mounted on each of the side walls of said chamber and resiliently bearing against the surface of said roller adjacent said side wall to seal the space therebetween, said drum having a cylindrical, soft white reflective surface with circumferential shallow grooves in said cylindrical surface, the walls of said grooves being disposed with respect to the axis of said drum at an angle not exceeding about 40°.

References Cited in the file of this patent

UNITED STATES PATENTS

| | | |
|---|---|---|
| 601,883 | Schwarz | Apr. 5, 1898 |
| 1,082,678 | Casler | Dec. 30, 1913 |
| 2,033,290 | Landrock | Mar. 10, 1936 |
| 2,574,215 | Kunstadter | Nov. 6, 1951 |
| 2,955,732 | Stobb | Oct. 11, 1960 |

FOREIGN PATENTS

| | | |
|---|---|---|
| 548,072 | Great Britain | Sept. 24, 1942 |